(12) United States Patent
Gur et al.

(10) Patent No.: US 8,285,554 B2
(45) Date of Patent: Oct. 9, 2012

(54) METHOD AND SYSTEM FOR DYNAMIC ALIASING SUPPRESSION

(75) Inventors: Arie Gur, Kiryat Ono (IL); Israel Greiss, Ra'Anana (IL)

(73) Assignee: DSP Group Limited, Greiss (IL)

( * ) Notice: Subject to any disclaimer, the term of this patent is extended or adjusted under 35 U.S.C. 154(b) by 1178 days.

(21) Appl. No.: 11/829,402

(22) Filed: Jul. 27, 2007

(65) Prior Publication Data
US 2009/0030536 A1    Jan. 29, 2009

(51) Int. Cl.
*G10L 19/00*    (2006.01)
(52) U.S. Cl. ........ 704/500; 700/501; 700/502; 700/503; 700/504
(58) Field of Classification Search ........... 704/500–504
See application file for complete search history.

(56) References Cited

U.S. PATENT DOCUMENTS

| | | | |
|---|---|---|---|
| 6,154,158 A | 11/2000 | Walker | |
| 6,246,645 B1 * | 6/2001 | Tsutsui | 369/44.24 |
| 6,487,535 B1 * | 11/2002 | Smyth et al. | 704/500 |
| 6,522,747 B1 | 2/2003 | Reilly et al. | |
| 6,628,781 B1 * | 9/2003 | Grundstrom et al. | 379/406.14 |
| 2007/0078645 A1 * | 4/2007 | Niemisto et al. | 704/200.1 |
| 2007/0109158 A1 | 5/2007 | Katz | |
| 2008/0059201 A1 * | 3/2008 | Hsiao | 704/500 |
| 2008/0253553 A1 * | 10/2008 | Li et al. | 379/406.05 |

* cited by examiner

*Primary Examiner* — Leonard Saint Cyr
(74) *Attorney, Agent, or Firm* — Hasse & Nesbitt LLC; Daniel F. Nesbitt

(57) ABSTRACT

A method of for aliasing suppression in a sub-band speakerphone system, comprising receiving an analog audio signal from a near end analog audio input interface, converting said analog audio signal into a near end digital audio signal using an A2D; receiving $N \geq 2$ sub-bands decoded digital audio data from a far-end, merging said $N \geq 2$ sub-bands decoded digital audio data into a wideband (WB) decoded digital audio data to be converted by D2A unit and provided to analog audio output interface; splitting said near-end digital audio signal into $N \geq 2$ near-end sub-bands digital audio signals; subtracting a simulated digital signal from said sub-band digital audio signal, wherein said simulated digital signal is created by an echo cancelling unit; and applying dynamic anti aliasing suppression (DAAS) with varying aggressiveness on each of said $N \geq 2$ near-end sub-band digital audio signals.

13 Claims, 6 Drawing Sheets

METHOD AND SYSTEM FOR DYNAMIC ALIASING SUPPRESSION

FIELD OF THE INVENTION

The present invention relates generally to the field of aliasing suppression and more particularly to a method and system for aliasing suppression in wide band telephony echo canceller systems.

BACKGROUND OF THE INVENTION

Current standards of voice transmission refer to wideband (WB) audio signals. For example the standard G722 refers to a 16 KHz sampling rate (8 KHz spectrum bandwidth) with division to two sub bands (SB) of 4 KHz each.

The communication according to the standards, such as G722 includes transformation of the analog signal from the speakers end into digital signal, splitting the WB into two SB, encoding each of the two SB and transmission of the encoded sub bands over the network.

The traditional approach at the receiving end suggests decoding both encoded sub bands and merging the two sub bands. However this approach further requires processing a signal that is sampled at a relatively high sampling frequency. For example if this approach is applied on a G722 system, then the merged signal should be sampled at the rate of 16 KHz.

To reduce the processing load, the signal may be decoded on each of the two sub bands, but not merged immediately thereafter and by that enabling to perform echo cancelling and various DSP (digital signal processing) on low frequency sub-bands. However if the sub bands are not merged immediately after decoding, each of the sub-band signals is carrying a significant non linear aliasing component. Thus, the advantage of low sampling frequency causes a non linear aliasing problem.

The processing of two sub bands in half sampling rate provides a benefit only if there is an efficient and low cost method to suppress the non linear aliasing component that is contained in each of the two sub bands.

SUMMARY OF THE INVENTION

An aspect of an embodiment of the invention relates to a method and a system for suppressing a non linear aliasing component from an audio sub band channel.

In an exemplary embodiment of the invention sub-bands near-end digital signal is passing through a dynamic anti aliasing suppressor (DAAS) wherein the level of aggressiveness applied by the DAAS is changing dynamically according to the activity of both near and far ends and also according to the relation between their activities, i.e. whose end is increasing/decreasing.

In an exemplary embodiment of the present invention alias suppression is performed on the sub-band near end digital signal by subtracting a simulated digital signal from the near-end sub-band digital signal, wherein the simulated digital signal is calculated after applying an anti aliasing suppression (AAS) on a sampled far-end sub-band digital signal wherein the level of the aliasing suppression is kept continuously at a predefined level.

In an exemplary embodiment of the invention there is provided an efficient method and system for non linear aliasing cancellation, enabling to perform echo cancelling and other DSP on a relatively low frequency sub bands, while performing these tasks with relatively reduced resources.

In an exemplary embodiment of the invention there is provided a method for aliasing suppression in a sub-band speaker-phone system, comprising receiving an analog audio signal from a near end analog audio input interface converting said analog audio signal into a near end digital audio signal using an A2D; receiving $N \geq 2$ sub-bands decoded digital audio data from a far-end, merging said $N \geq 2$ sub-bands decoded digital audio data into a wideband (WB) decoded digital audio data to be converted by D2A unit and provided to analog audio output interface; splitting said near-end digital audio signal into $N \geq 2$ near-end sub-bands digital audio signals; subtracting a simulated digital signal from said sub-band digital audio signal, wherein said simulated digital signal is created by an echo cancelling unit; and applying dynamic anti aliasing suppression (DAAS) with varying aggressiveness on each of said $N \geq 2$ near-end sub-band digital audio signals.

In an exemplary embodiment of the invention the varying aggressiveness is responsive to the activity of said far-end and the activity of said near-end analog audio input interface.

In an exemplary embodiment of the invention the varying aggressiveness is defined at a predefined maximal level when only far-end is active, approximately zero when far-end is inactive and at predefined intermediate levels of aggressiveness when both far-end and near-end are simultaneously active.

In an exemplary embodiment of the invention the DAAS is performed on the $N \geq 2$ near-end sub-bands signals before subtracting a simulated digital signal from said digital audio signal.

In an exemplary embodiment of the invention the DASS is performed on the $N \geq 2$ near-end sub-bands signals after subtracting a simulated digital signal from said digital audio signal.

In an exemplary embodiment of the invention the echo cancelling unit receives a signal that is sampled from said sub-bands decoded digital audio data from a far-end and suppressed by an anti aliasing suppressor (AAS) that is continuously active.

In an exemplary embodiment of the invention the AAS suppression level is approximately equal to said maximal level of said DAAS.

In an exemplary embodiment of the invention the number N of sub-bans equals to two.

In an exemplary embodiment of the invention the splitting the near-end digital audio is performed by a G722 QMF.

In an exemplary embodiment of the invention the near end analog audio input interface is a microphone.

In an exemplary embodiment of the invention the near end analog audio output interface is speaker.

In an exemplary embodiment of the invention there is provided a method for reducing computing resources by allocating lesser amount of coefficients for the High sub-band then the amount of coefficients that are allocated to the Low sub-band.

In an exemplary embodiment of the invention there is provided a method for aliasing suppression in a sub-bands audio system, comprising providing near-end analog audio input interface; providing a far-end; transmitting near-end audio signal from said near-end to said far-end and receiving far-end audio from said far-end by said near-end; applying a dynamic anti aliasing suppression (DAAS) with varying aggressiveness on the near-end audio signal.

In an exemplary embodiment of the invention the varying aggressiveness is responsive to the activity of said far-end and the activity of said near-end.

In an exemplary embodiment of the invention there is provided a speaker phone system that performs dynamic anti aliasing suppression on sub-bands digital audio signals, comprising: $N \geq 2$ sub-bands decoders that decode encoded digital audio data that is transmitted by a far-end audio source; a combining device for receiving and merging decoded audio data that is transmitted by said $N \geq 2$ sub-band decoders; a digital to analog converter that transforms the output from said combining device into an analog audio signal and provides the analog audio signal to an analog audio output interface; a near-end analog audio input interface that provides analog audio signal that is converted into digital audio signal by A2D unit and split into $N \geq 2$ sub-bands of digital audio signal; N dynamic anti aliasing suppressors (DAAS) where each of said $N \geq 2$ DAAS suppresses one of said N sub-bands of digital audio signal applying a varying level of aggressiveness; N subtraction units, each subtraction unit receives a suppressed sub-bands of digital audio data after being suppressed by said DASS and subtract an echo cancelling signal that is provided by an echo cancelling unit; and N encoders, where each of the encoders receives and encodes the output of one subtracting unit.

BRIEF DESCRIPTION OF THE DRAWINGS

The present invention will be understood and appreciated more fully from the following detailed description taken in conjunction with the drawings. Identical structures, elements or parts, which appear in more than one figure, are generally labeled with a same or similar number in all the figures in which they appear, wherein.

DETAILED DESCRIPTION OF THE INVENTION

Figure 1:
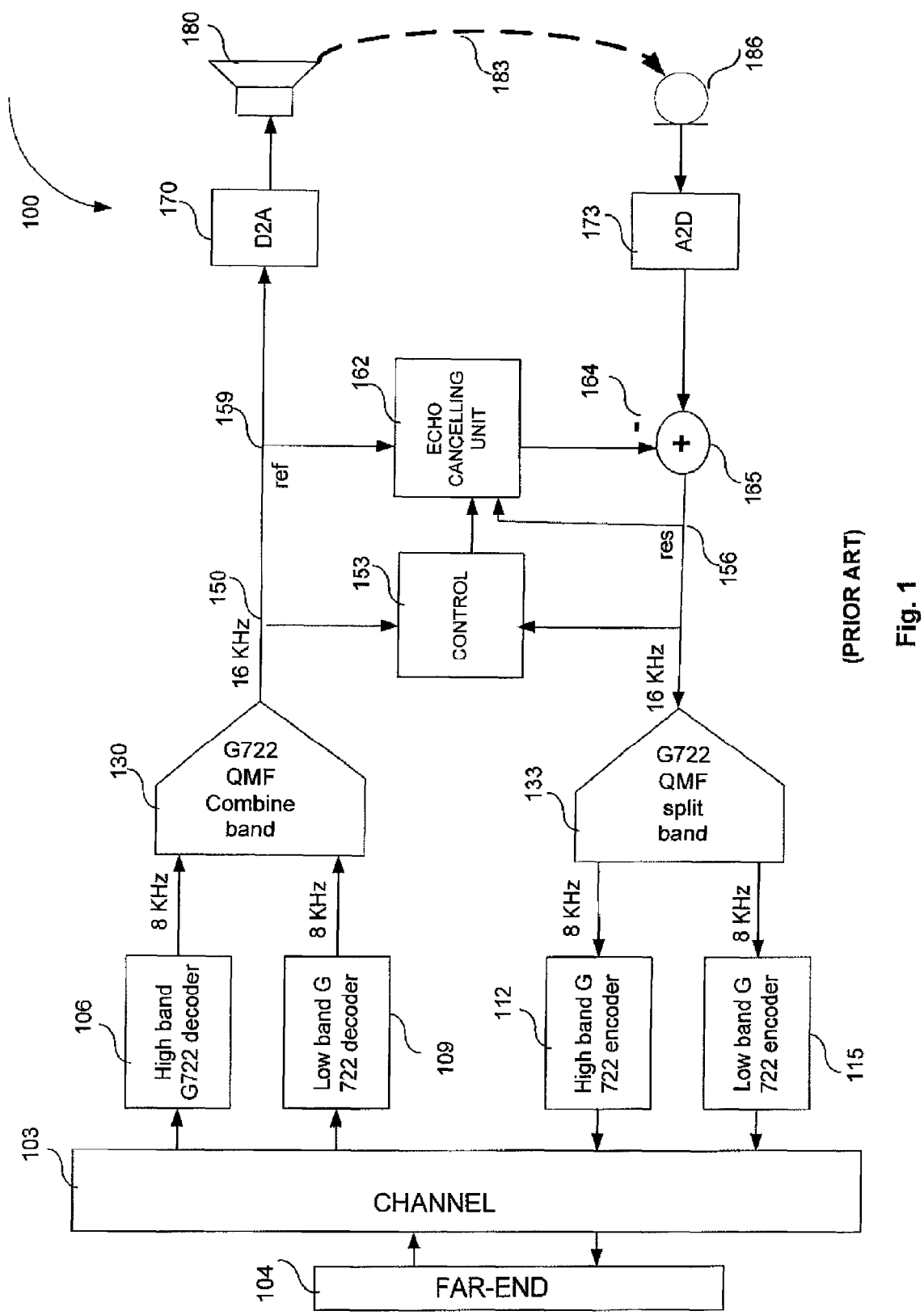
FIG. 1 is a block diagram of a G722 compliant speaker-phone system according to prior art design.

FIG. 1 shows a block diagram of a G722 compliant speaker-phone system 100 according to prior art design.

The purpose of the system is to transmit audio from a near-end source to a far-end receiving member and vice versa, i.e. receiving audio from a far-end source by a near-end member. The main problem is to cancel the near side echo 183 which causes severe deterioration of the signal quality perceived on the far end.

The system includes a microphone 186 and a speaker 180 located at the near-end. The analog audio signal that is created by the microphone 186 is converted to a digital audio signal that is sampled at 16 KHz by an analog to digital converter A2D 173 and proceeds to a quadrature mirror filter (QMF) splitter 133 after subtraction of a calculated echo 165 that is provided by an echo cancelling unit 162. The echo canceling unit functions in two modes: in the first mode when a control unit 153 provides an indication that only the far side is talking and the signal received by microphone 186 is only provided by a far-end 104, the echo canceling unit 162 attempts to reduce the signal at the residual point (res) 156 to zero usually by adapting its coefficients. The echo canceller function in this mode is to simulates and track the echo path 183. In a second mode when the near side is talking, it does not adapt the echo cancelling unit 162 coefficients and just subtracts the estimated echo by the subtraction unit 165. It should be noted that subtraction unit 165 is typically implemented by an adder that adds the signal to be subtracted with a negative sign (this technique depends on a specific method of the signal presentation such as 1's complement or 2's complement), therefore the subtraction unit 165 appears with a plus sign and the input signal from the echo cancelling unit 162 appears with a minus sign 164.

The signal that arrives to the QMF 133 is split into two sub-bands, each having a bandwidth of 4 KHz. Each sub-band is sampled at 8 KHz. Each of the two sub-bands, is encoded by a G722 encoder 112 and 115 respectively and transmitted over a channel 103 to the far end 104 to be received by a compliant circuit to activate a speaker at the far-end (not shown).

In the opposite direction two encoded sub bands carrying encoded digital audio signal arrive from the channel 103 and are decoded by a G722 decoders 106 and 109 respectively. The two sub-bands of decoded digital audio signal are sampled at 8 KHz and are merged in a G722 QMF 130 to a single wideband (WB) that is sampled at 16 KHz and is converted to an analog signal in the D2A 170 and played by the speaker 180. The broken line 183 shows the echo path from the speaker 180 to the microphone 186.

A drawback of the system that is shown in FIG. 1 is that the digital processing of the signal at the echo canceller 162 and the control 153 is performed on a signal that is sampled at 16 KHz and therefore it requires significant processing resources. Furthermore, additional digital signal processing (DSP) activities that could be performed on the wideband signal also require significant processing resources due to the relatively high sampling rate of the merged signal.

Reducing processing complexity may be achieved by over sampled sub-band echo canceller, but adding such canceller adds delay to the system. In the system according to the invention the QMF filters which split the band already exist, but the system uses low delay filters that have significant overleaping frequency area which produce aliasing distortion if the High band and Low band are not identical which happen in most cases of echo path. The main purpose of this invention is to suppress the alias component from the echo without degradation in the quality of the signal received from the microphone 186.

Figure 2A:
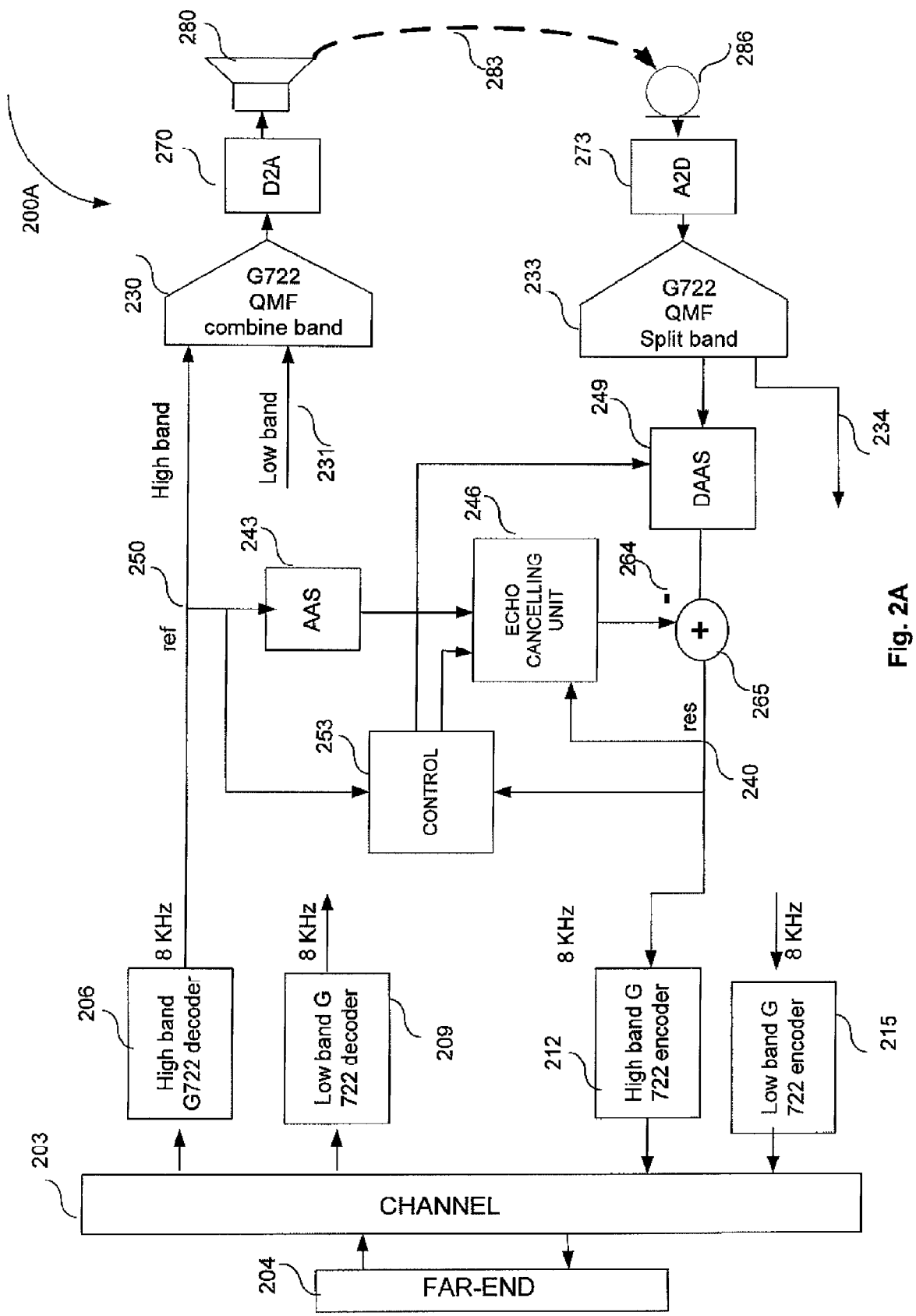
FIG. 2A is a block diagram of a G722 compliant speaker-phone system according to an exemplary embodiment of the invention.

FIG. 2A shows a block diagram of a G722 compliant speaker-phone system 200 according to one embodiment of the invention. While the general structure of the system shown in FIG. 2 resembles to the system that is shown in FIG. 1, FIG. 2A is described in detail with reference to the differences from FIG. 1.

The near-end analog audio signal that is created by the near-end microphone 286 is converted to a near-end digital audio signal by an A2D unit 273 and split by a G722 QMF splitter 233 to two sub-bands digital audio signals, high sub-band and low sub-band, where each sub-band is sampled at 8 KHz. While the path of both high and low sub-bands are identical, only one sub-band path is shown in FIG. 2. The digital audio signal of each sub-band passes through a dynamic anti aliasing suppressor (DAAS) 249 whose functionality will be later explained in detail. A simulated echo signal that is created by the echo cancelling unit 246 is subtracted 265 from the DAAS output. The signal is then measured by the control 253 unit and is encoded by a G722 encoder 212 (and 215 for the other sub-band). The encoded signal is then sent over the channel 203.

On the opposite direction two sub-bands: High sub-band and Low sub-band far-end encoded audio signals arrive from the channel 203 at a sampling rate of 8 KHz and are intercepted by two decoders: high sub-band G722 decoder 206 and low sub-band decoder 209. While the two sub-bands are passing a similar path, FIG. 2 shows only the high sub-band path. The decoded digital audio signal high sub-band proceeds to a G722 QMF 230 that receives also the low sub-band and merges the high and low sub-bands into a wideband 8 KHz digital audio signal that is sampled at 16 KHz. The signal is than converted from analog to digital by D2A 270 and is played by a near-end speaker 280. The broken line 283 indicates the echo path between the near-end speaker 280 and the near-end microphone 286.

On the way from the high sub-band G722 decoder 206 to the G722 QMF 230 the signal is measured by the control unit 253 and processed by an anti aliasing suppressor (AAS) 243. The AAS 243 is active continuously. The AAS filters the reference signal (ref) point 250 with the same frequency response as the DAAS 249 frequency response which performed on the Microphone path. In another exemplary embodiment of the invention the AAS may be omitted. Its function can be performed in the Echo cancelling filter 246. The AAS output is directed to an echo cancelling unit 246 that functions in two modes of operation. In the first mode when the control unit 253 provides an indication that only Far side is active and the near-end microphone 286 incoming signal source is only from the far-end 204—the echo canceling unit 246 is trying to reduce the signal at the residual point (res) 240 to zero by adapting it's inside filter coefficients. When the near-side is active the echo canceller functions in a second mode when it just cancels the echo by subtraction unit 265 based on estimation of the echo.

While the AAS 243 is active continuously, the dynamic anti aliasing suppressor (DAAS) 249 is changing its level of aggressiveness dynamically according to the decision on conversation direction which control unit 253 produces.

FIG. 2A shows a system wherein the echo cancelling is performed on a signal that is sampled at 8 KHz, performing processing at 8 KHz is significantly consuming less computing resources than performing processing on a signal that is sampled at 16 KHz as shown in FIG. 1.

In an exemplary embodiment of the invention processing resources can be further improved compared to conventional approach by allocating different amount of coefficients to each sub-band echo cancelling unit. While a plurality of coefficients are allocated for each sub-band echo cancelling unit, the ability of allocating lesser amount of coefficients to the High sub-band echo cancelling unit then the amount of allocated coefficients for the Low sub-band echo cancelling unit (when N=2) enables to reduce the processing resources.

The aspect of consuming less computing resources in the exemplary method and system that are described in FIG. 2A applies not only to the echo cancellation DSP but also to other optional functions that may be performed in various speakerphone systems.

Figure 2B:
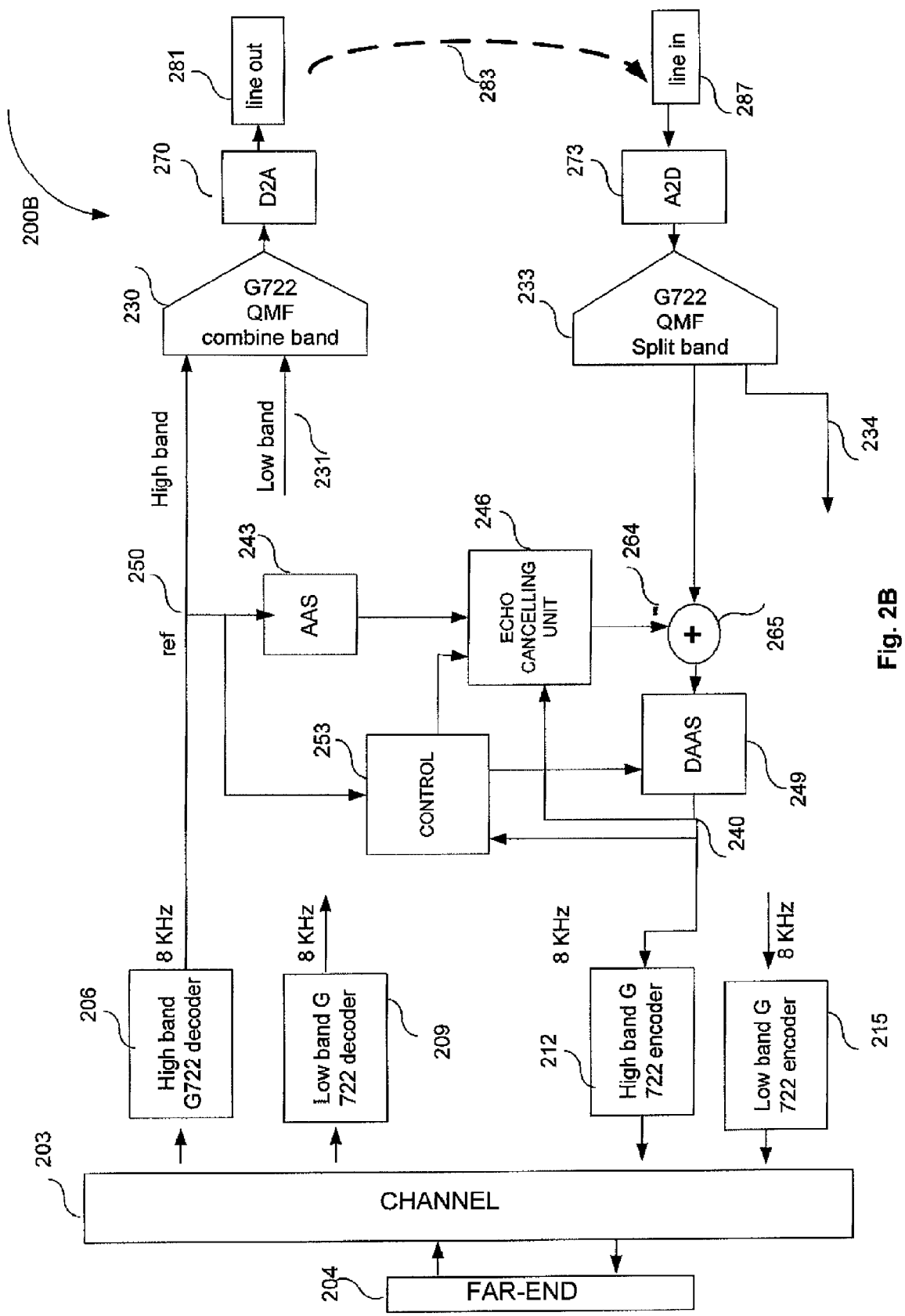
FIG. 2B is a block diagram of a G722 compliant speaker-phone system according to another exemplary embodiment of the invention where a DAAS unit is located after the subtraction unit.

FIG. 2B shows another exemplary embodiment of the invention, wherein the DAAS 249 is located after the subtraction unit 265, i.e. closer to the channel 203.

It should be noted that all four combinations of placing the DAAS 249 as shown in FIG. 2A or FIG. 2B and including or omitting the AAS are eligible according to the invention.

FIG. 2B further shows an exemplary embodiment of the invention where the near-end speaker 280 of FIG. 2A is replaced with a line-out 281 and the near-end microphone 286 of FIG. 2B is replaced with a line-in 287. It should be noted that the line-in 287 or near-end microphone 286 may be replaced with any type of analog audio input interface and the line-out 281 or near-end speaker 280 may be replaced with any type of analog audio output interface.

Figure 3:
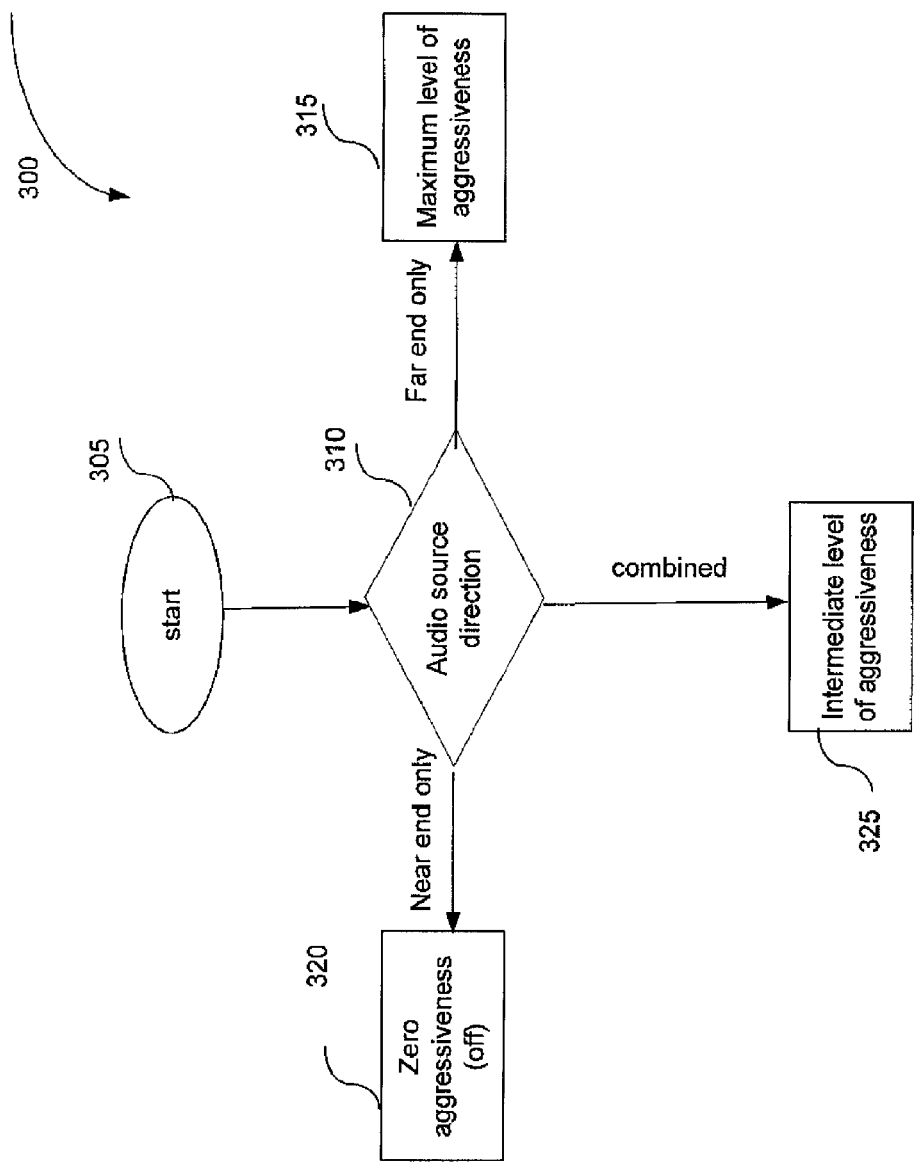
FIG. 3 is a flow chart describing the DAAS dynamic operation mode according to an exemplary embodiment of the invention.

FIG. 3 is showing a flowchart 300 that describes the DAAS 249 functionality. While the DAAS is activated in varying levels of aggressiveness there is a need to continuously control the level of aggressiveness of the DAAS 249 According to an exemplary embodiment of the invention the system is continuously querying (310) the direction of the digital audio signal that is transferred by the system. If only the far end is active than the suppressor aggressiveness is operated at its maximum intensity (315), i.e. in maximal predefined level of aggressiveness, if only the near end is active the suppressor aggressiveness is reduced to minimum (320) (approximately zero), and for any other combination of both far and near end active speakers, the suppressor is gradually activated with intermediate levels of aggressiveness (325).

Figure 4:
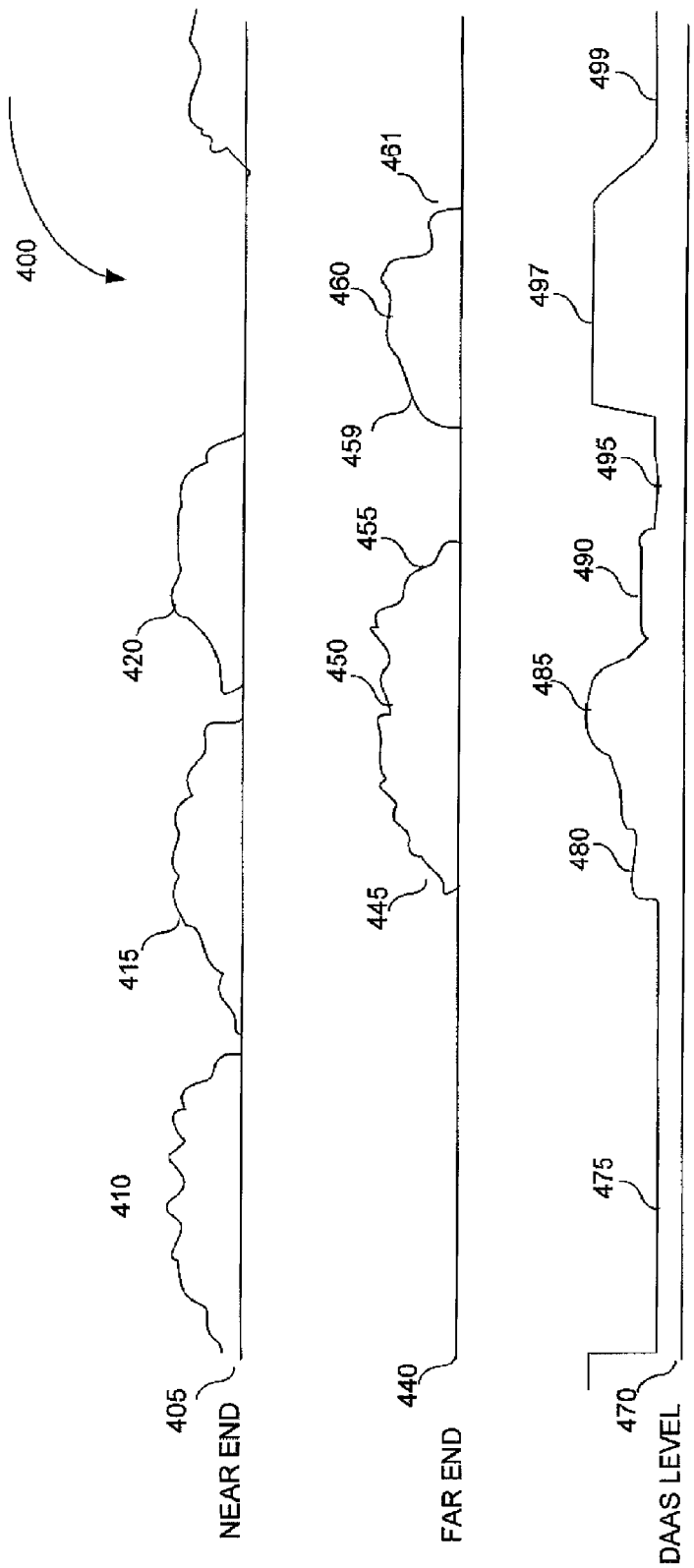
FIG. 4 is a diagram representing an exemplary scenario of near-end and far-end activity and the DAAS functionality according to an exemplary embodiment of the invention.

FIG. 4 shows a diagram 400 describing an exemplary scenario of near-end and far-end activity and the DAAS 249 functionality according to an exemplary embodiment of the invention. The first axis shows the activity of the near-end 405 wherein four periods of activity are described 410, 415, 420 and 425

The second axis shows the activity of the far-end 440 where two periods of activity are described 450 and 460. The third axis shows the level of DAAS aggressiveness, as follows: when only the near-end is active 410 and first half of 415 the DASS aggressiveness level is minimal, i.e. zero aggressiveness 475 (far-end is silent and therefore there is no echo to be suppressed). As the far-end starts to create a signal 445, the level of aggressiveness of the DASS 249 is defined in an intermediate level 490, when there is a short period where only far-end is active 450—the level of DASS aggressiveness reaches the maximal level 485 and right afterwards, when the near-end is activated again 420 the level of aggressiveness of DAAS 249 returns to an intermediate level 490. When the far-end is deactivated between 455 and 459—the level of DAAS aggressiveness decreases again to zero 495, and when only the far-end is active 460, the level of DAAS aggressiveness returns to maximal level 497 until the far-end is deactivated 461 and the level of DAAS aggressiveness decreases again to zero 499.

Figure 5:
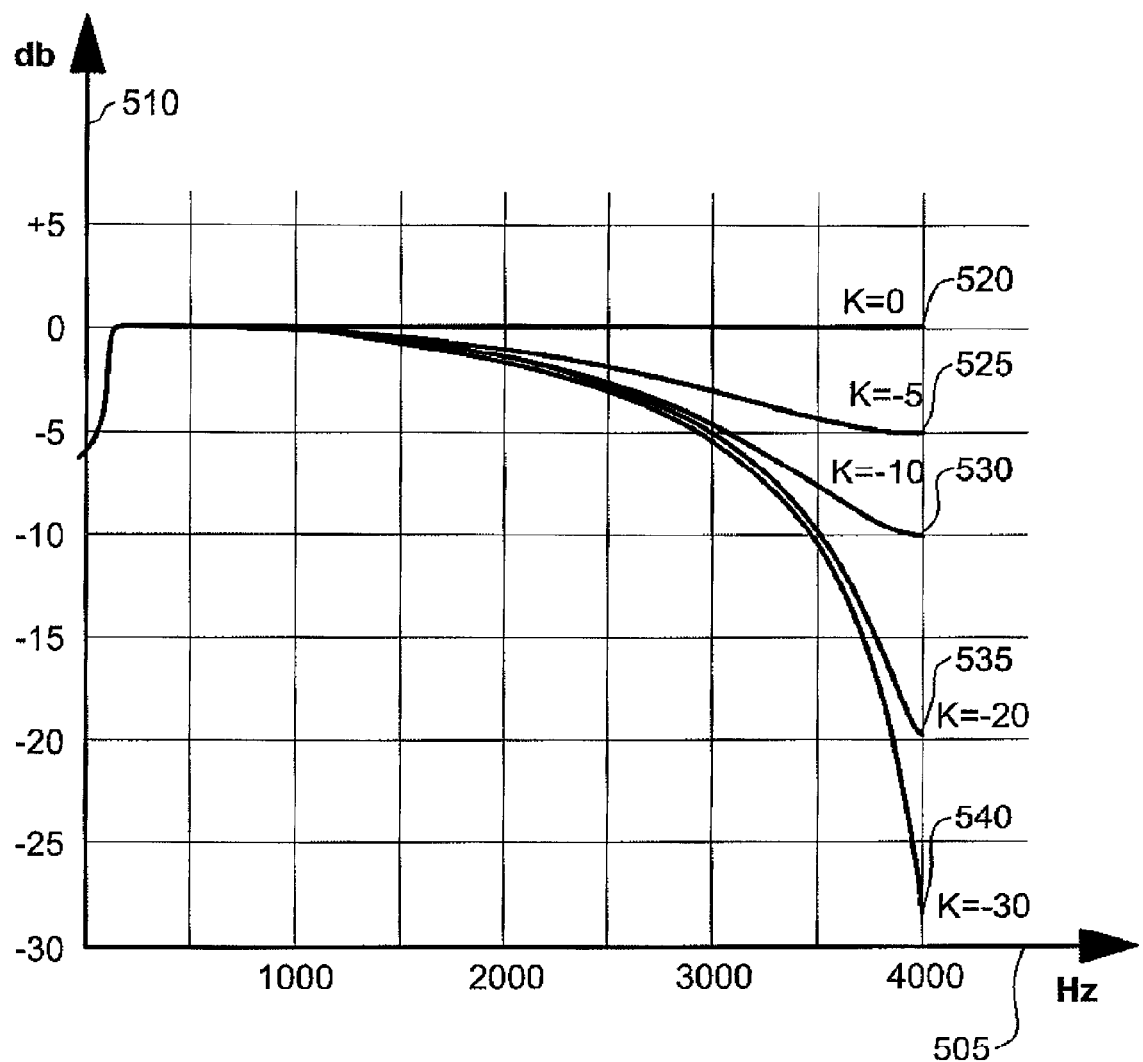
FIG. 5 is diagram that shows the DASS suppression level versus frequency at five modes of operation according to an exemplary embodiment of the invention.

FIG. 5 shows a graph of DASS suppression level in db 510 versus signal frequency 505 for five levels of DAAS aggressiveness 520, 525, 530, 535 and 540 according to an exemplary embodiment of the invention.

The graphs in FIG. 5 describe the result of the frequency response of DAAS filter for different aggressiveness Kdb [dB] using following equations:

$$Fs=8000;$$

$$BW=Fs/2-Fp;$$

$$w=2*pi*BW/Fs;$$

$$K=10^{\wedge}(Kdb/20);$$

$$C=(1-\tan(w/2)/\tan(w/2)+1));$$

$Y_f = \text{filter}([C,1],[1,C_f],X);$ $Y = 0.5*(X+Y_f+(X-Y_f)*K);$ where Y is output, X is input and C is the filter coefficient, K is the level of attenuation (aggressiveness) calculated from desired Kdb (in dB), Fs is the sampling frequency, BW is the filter Band Width, Fp is the passing frequency.

The graphs in FIG. 5 show the different levels of aggressiveness effect with reference to the frequency axis when Fp is 2500 Hz.

The first graph 520 describes a zero level aggressiveness, 0 db, which is a good approximation to the DAAS level when far-end is inactive. When only the far-end is active, the level of DAAS aggressiveness is maximal 540 and in an exemplary embodiment of the invention the DAAS 249 suppression will be approximately −28 db at the highest frequency of 4000 Hz. When both far-end and near-end are simultaneously active or at transition periods between maximal and zero aggressiveness—intermediate level of aggressiveness will be applied as shown in 525, 530 and 535.

It should be appreciated that the above described methods and systems may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

Section headings are provided for assistance in navigation and should not be considered as necessarily limiting the contents of the section.

It will be appreciated by persons skilled in the art that the present invention is not limited to what has been particularly shown and described hereinabove. Rather the scope of the present invention is defined only by the claims, which follow.

We claim:

1. A method for aliasing suppression in a sub-band speaker-phone system, the method comprising the steps of:
    a. receiving an analog audio signal from a near end analog audio input interface,
    b. converting said analog audio signal into a near end digital audio signal using an A2D;
    c. receiving N≧2 sub-bands decoded digital audio data from a far-end, merging said N≧2 sub-bands decoded digital audio data into a wideband (WB) decoded digital audio data to be converted by D2A unit and provided to analog audio output interface;
    d. splitting said near-end digital audio signal into N≧2 near-end sub-bands digital audio signals;
    e. subtracting a simulated digital signal from each of said N≧2 sub-bands digital audio signal, wherein said simulated digital signal is created by an echo cancelling unit; and
    f. applying dynamic anti aliasing suppression (DAAS) with varying aggressiveness on each of said N≧2 near-end sub-band digital audio signals for suppressing an existing non linear aliasing component, wherein said varying aggressiveness is responsive to the activity of said far-end and the activity of said near-end analog audio input interface, and wherein said varying aggressiveness is defined at a predefined maximal level when only far-end is active, approximately zero when far-end is inactive and at a predefined intermediate levels of aggressiveness when both far-end and near-end are simultaneously active.

2. The method according to claim 1, wherein the DAAS is performed on the N≧2 near-end sub-bands signals before subtracting a simulated digital signal from said digital audio signal.

3. The method according to claim 1, wherein the DASS is performed on the N≧2 near-end sub-bands signals after subtracting a simulated digital signal from said digital audio signal.

4. The method according to claim 1, wherein said echo cancelling receives a signal that is sampled from said sub-bands decoded digital audio data from a far-end and suppressed by an anti aliasing suppressor (AAS) that is continuously active.

5. The method according to claim 4, wherein said AAS suppression level is approximately equal to said maximal level of said DAAS.

6. The method according to claim 1, wherein N=2.

7. The method according to claim 1, wherein said splitting said near-end digital audio is performed by a G722 QMF.

8. The method according to claim 1, wherein said near end analog audio input interface is a microphone.

9. The method according to claim 1, wherein said analog audio output interface is a speaker.

10. The method according to claim 1, wherein said echo cancelling units optionally allocates a different number of coefficients.

11. The method according to claim 1, wherein N=2 and wherein the splitting of said near-end digital audio is performed by a G722 QMF and wherein the number of allocated coefficients for the High band echo canceller is lesser than the number of allocated coefficients for the Low band echo canceller.

12. A method for aliasing suppression in a sub-bands audio system, the method comprising the steps of:
    a. providing near-end analog audio input interface;
    b. providing a far-end;
    c. transmitting near-end audio signal from said near-end to said far-end and receiving far-end audio from said far-end by said near-end;
    d. applying a dynamic anti aliasing suppression (DAAS) with varying aggressiveness on the near-end audio signal, for suppressing an existing non linear aliasing component, wherein said varying aggressiveness is responsive to the activity of said far-end and the activity of said near-end, and wherein said varying aggressiveness is defined at a predefined maximal level when only far-end is active, approximately zero when far-end is inactive and at a predefined intermediate levels of aggressiveness when both far-end and near-end are simultaneously active.

13. A speaker phone system that performs dynamic anti aliasing suppression on sub-bands digital audio signals, the system comprises:
    a. N≧2 sub-bands decoders that decode encoded digital audio data that is transmitted by a far-end audio source;
    b. a combining device for receiving and merging decoded audio data that is transmitted by said N≧2 sub-band decoders;
    c. a digital to analog converter that transforms the output from said combining device into an analog audio signal and provides the analog audio signal to analog audio output interface;
    d. a near-end analog audio input interface that provides analog audio signal that is converted into digital audio signal by A2D unit and split into N≧2 sub-bands of digital audio signal;

e. N dynamic anti aliasing suppressors (DAAS) where each of said N≧2 DAAS suppresses one of said N sub-bands of digital audio signal applying a varying level of aggressiveness to suppress an existing non linear aliasing component, wherein said varying aggressiveness is defined at a predefined maximal level when only far-end is active, approximately zero when far-end is inactive and at a predefined intermediate levels of aggressiveness when both far-end and near-end are simultaneously active;

f. N subtraction units, each subtraction unit receives a suppressed sub-bands of digital audio data after being suppressed by said DASS and subtract an echo cancelling signal that is provided by an echo cancelling unit; and g. N encoders, where each of the encoders receives and encodes the output of one subtracting unit.

\* \* \* \* \*